Patented Oct. 6, 1931

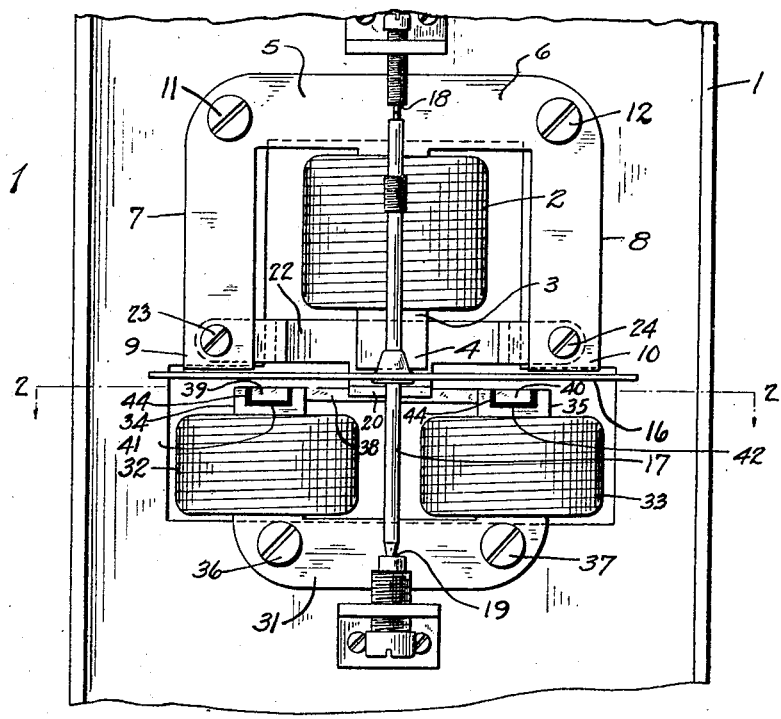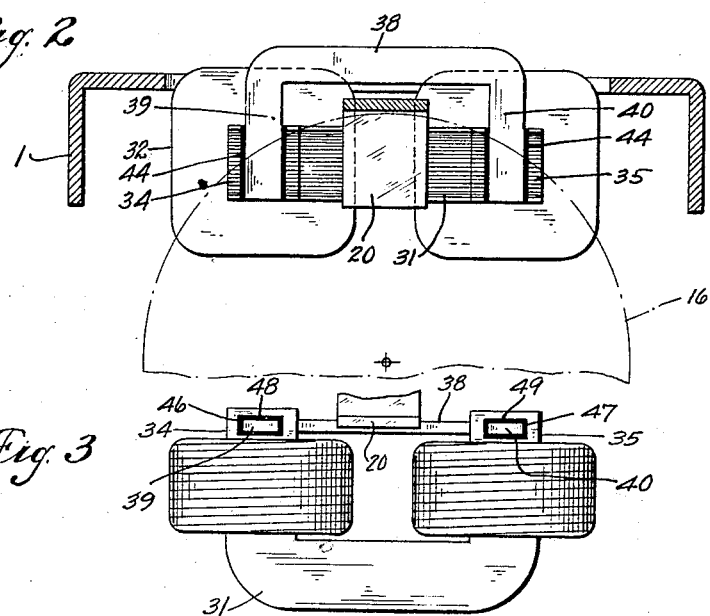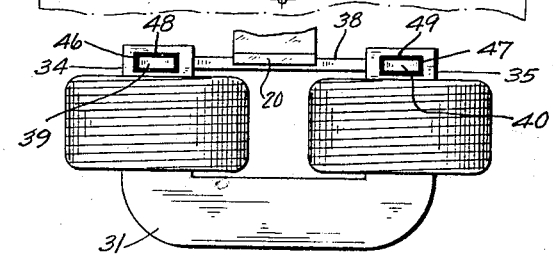

1,826,447

UNITED STATES PATENT OFFICE

WILLI BEUSCH, OF ZUG, SWITZERLAND, ASSIGNOR TO LANDIS & GYR, A.-G., OF ZUG, SWITZERLAND, A LIMITED JOINT-STOCK COMPANY OF SWITZERLAND

INDUCTION METER

Application filed May 24, 1928, Serial No. 280,261, and in Switzerland June 22, 1927.

The invention relates to new and useful improvements in induction meters, and more especially to novel and useful magnetic flux devices used in connection with the current cores in induction meters.

Objects and advantages of the invention will be set forth in part hereinafter and in part will be obvious herefrom, or may be learned through practicing the invention, the same being realized and attained through the instrumentalities pointed out in the appended claim.

The accompanying drawings, referred to herein and constituting a part hereof, illustrate one embodiment of the invention, and together with the description, serve to explain the principles of the invention.

Of the drawings:—

Fig. 1 is an elevation of a meter mechanism embodying the invention;

Fig. 2 is a horizontal section taken on line 2—2 of Fig. 1; and

Fig. 3 is a fragmentary elevation corresponding to the bottom part of Fig. 1 and showing a modified embodiment of the invention.

In the present preferred embodiment of the invention, illustrated exemplarily in the accompanying drawings, there is mounted in a meter casing 1 a pressure coil 2 wound upon the central branch 3 of a pressure core, having a pole 4. The core has also transverse branches 5 and 6 extending from the end of the central branch 3 and these are angled to extend toward the meter disc at either side of the current core as shown at 7 and 8 and terminate in poles 9 and 10. The pressure core is suitably supported within the casing, as by screws 11 and 12.

A meter disc 16 is fixed on a spindle 17, which is journaled at its ends in bearings 18 and 19. A counter pole or lag plate 20 is positioned on the opposite side of the meter disc from the voltage core, and this may be mounted in any suitable manner so far as concerns many features of the invention. As embodied, the counter pole is positioned between the poles of the current core and extends backwardly therefrom and is then bent upwardly and terminates in a transversely extending bar or plate 22, which bar at its extremities is supported from and connected to the parts 9 and 10 of the pressure core, by suitable means such as screws 23 and 24.

The current driving means comprise, as embodied, a U-shape core 31, on the arms of which are two current coils 32 and 33, the arms terminating in poles 34 and 35. The core is supported in any suitable way, and as shown is carried by screw studs 36 and 37 from the casing 1.

The magnetic shunt for the current core, as embodied, comprises a U-shape member 38 of suitable material, such as soft-iron, which is arranged transversely to the plane of the magnet core, and preferably horizontally in the plane of the meter disc. The ends of the arms 39 and 40 of the shunt piece, as shown in Fig. 1, are carried in slots or recesses in the terminals 34 and 35 of the current core 31, and are preferably narrower than the current core, thereby lying in the slots in the pole faces, and leaving both the outer side edges of the terminals intact. In this form, two rectangular slots 41 and 42 are formed in the central part of the terminal faces of the poles 34 and 35, and the ends of the arms 39 and 40 of the magnetic shunt piece rest in these slots or grooves. They may be fastened in place in any suitable way by a close fit or otherwise. As shown, a lining or bushing 44 of brass or other non-magnetic material is provided between the shunt piece and the walls of the apertures.

In Fig. 3 of the drawings a modification of the mounting of the shunt piece is shown, and in this figure two rectangular closed slots or apertures 46 and 47 are formed extending through the poles 34 and 35 of the current magnet near the ends thereof, the ends of the arms 39 and 40 of the shunt piece fitting tightly within the apertures 46 and 47. In this form also there are preferably bushings 48 and 49 of non-magnetic material, such as brass, around the arms 39 and 40 of the shunt piece within the slots 46 and 47. This form leaves the entire end of the poles 34 and 35 of the current core intact.

The invention in its broader aspects is not limited to the specific mechanism shown and described but departures may be made therefrom within the scope of the accompanying claim without departing from the principles of the invention and without sacrificing its chief advantages.

What I claim is:—

In combination in an induction meter, a current core having slotted pole pieces, the slots being positioned to leave the adjacent edges of the pole pieces intact, a U-shaped magnetic shunt piece carried in the slots, a bushing of non-magnetic material spacing the shunt piece from the pole pieces and supporting it in the slots, and a counterpole for the voltage magnet of the meter lying between the pole pieces of the current core.

In testimony whereof, I have signed my name to this specification.

WILLI BEUSCH.